M. N. Ward.
Tedder.

No. 87,383.  Patented Mar. 2, 1869.

Witnesses  
S. N. Piper  
J. P. Hale Jr.

Moses N. Ward  
by his attorney  
R. H. Eddy

UNITED STATES PATENT OFFICE.

MOSES N. WARD, OF BANGOR, MAINE, ASSIGNOR TO HIMSELF, BENJAMIN S. GRANT, AND THOMAS HERSEY, OF SAME PLACE.

IMPROVEMENT IN HAY-SPREADERS.

Specification forming part of Letters Patent No. 87,383, dated March 2, 1869.

*To all to whom these presents may come:*

Be it known that I, MOSES N. WARD, of Bangor, in the county of Penobscot and State of Maine, have invented a new and useful Improvement in Hay-Tedders; and do hereby declare the same to be fully described in the following specification and represented in the accompanying drawings, of which—

Figure 1:
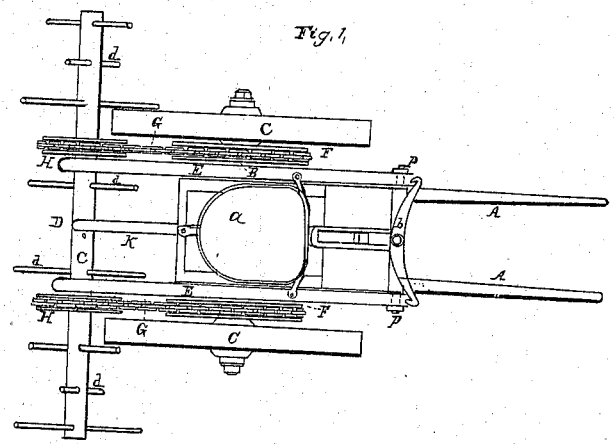
Figure 2:
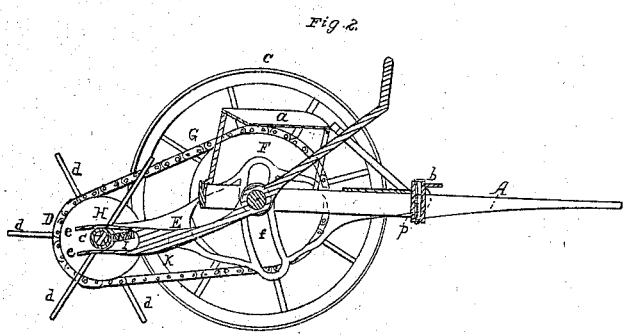

Figure 1 is a top view, and Fig. 2 a longitudinal section, of a tedder provided with my invention, which has reference to mechanism for supporting and operating the rotary head or spreader of the tedder.

In the drawings, A A denote a pair of thills projecting from an axle, B, provided with two wheels, C C. Each of the said wheels is to revolve freely on the journal of the axle. To the shafts a seat, $a$, and a whiffletree, $b$, are or may be applied. In rear of the wheels the rotary head or spreader D is arranged, in manner as represented, it consisting of a long shaft, $c$, and a series of arms, $d\ d\ d$, radiating from such shaft. This shaft extends between the prongs $e\ e$ of two furcated arms, E E, which are arranged against the sides of the shafts, and are pivoted thereto, the connections or pivots being at or near the front ends of such arms, as shown at $p\ p$. Each arm has a curved slot, $f$, made through it, to receive the axle, the purpose of the slot being to allow the arm to freely vibrate or wave up and down without interruption from the axle. One of two grooved wheels, F F, is fastened to the hub of each of the supporting-wheels C C. Endless chains G G go around the wheels F F and two other grooved wheels, H H, fixed on the spreader-shaft $c$. Furthermore, within the opening of the fork of each independent arm E there is a helical spring, I, whose purpose is to press the shaft outwardly, so as to keep the endless chains strained tightly on their wheels during the movements of the spreader.

A forked lever, K, applied to and arranged with the thills and the spreader, in manner as represented, serves to enable an attendant while sitting upon the seat of the machine to raise the spreader above and keep it off the ground, as may be necessary, while the spreader may be in use, the endless chains, by which the spreader is revolved, readily admitting of such movements of it. The two independent furcated arms and the peculiar mechanism for revolving the spreader allow it to play readily up and down and tip more or less, as occasion may require, in order to admit it to conform itself to the undulations of the surface of a field over which it may be drawn. As the said arms and the larger or driving wheels of the endless chains move on separate centers, the springs I I in the forks of the arms become necessary to keep the chains tight, so as to prevent them from slipping off their wheels during the vertical and rotary or tipping movements of the spreader.

By "independent arms" is meant arms so pivoted to the thills or carriage-frame and disconnected as to enable each of such arms to be moved vertically without effecting or causing a corresponding movement of the other. Thus each arm can move downward while the other may be moving upward, the purpose of this disconnection of the arms, when they are applied to the rotary spreader, being to enable the spreader while being moved over an undulating surface to tip laterally of the machine, in order to conform to the undulations of the surface.

In the hay-tedder represented in the United States Patent No. 70,870, granted November 12, 1867, to J. M. Low, the arms which support the spreader are so connected that one cannot be moved vertically without causing a corresponding movement of the other, and thus the spreader can only move up and down in one plane, and can have no lateral tipping movement, as is the case with the spreader of my machine.

I therefore make no claim to connecting the spreader to the wheel-axle or the carriage-frame by arms so connected that one cannot be moved either upward or downward without creating a corresponding movement of the other; nor do I claim, under such circumstances, the employment of a train of gearing and shafting to effect the rotary movement of the spreader, such being as shown in the machine of the said Low. I use instead thereof endless driving-chains and grooved supporting-wheels applied to the wheel and spreader-axles, such, while serving to produce rotary motion of the spreader, allowing it to tip, as occasion may require.

In Low's machine the gearing and cross-shaft operate to prevent any such tipping of the spreader, and therefore, by substituting the grooved wheels and the endless chains for such gearing, I gain an advantage which causes such wheels and chains, when employed with the disconnected or independent levers, the spreader, and the driving-wheel axles, to be more than a mechanical equivalent for the mechanism employed by Low to revolve his spreader.

I make no claim to a rotary spreader, nor to the combination of such with a wheel-carriage and mechanism for effecting the revolutions of the spreader by the wheels while revolving or being drawn over a surface or field.

I claim—

1. The combination and arrangement of the two independent arms, the endless driving-chains, and their grooved supporting-wheels with the rotary spreader and the thills or carriage-body and the supporting-wheels thereof.

2. I also claim the combination and arrangement of the springs I I with the spreader, the two independent arms, the endless chains and their supporting-wheels, and the carriage, as described.

MOSES N. WARD.

Witnesses:
R. H. EDDY,
F. P. HALE, Jr.